United States Patent
Kumar et al.

(10) Patent No.: US 7,075,613 B2
(45) Date of Patent: Jul. 11, 2006

(54) ELECTRO-OPTICAL DISPLAY WITH IN-SITU POLYMERIZED COLUMNS PROVIDING ALIGNMENT AND STRUCTURAL BOND BETWEEN SUBSTRATE

(75) Inventors: Satyendra Kumar, Kent, OH (US); Bharat Raj Acharya, Piscataway, NJ (US); Hyunchul Choi, Dae-gu (KR)

(73) Assignee: Kent State University, Kent, OH (US)

( * ) Notice: Subject to any disclaimer, the term of this patent is extended or adjusted under 35 U.S.C. 154(b) by 335 days.

(21) Appl. No.: 10/222,745

(22) Filed: Aug. 16, 2002

(65) Prior Publication Data

US 2004/0032561 A1 Feb. 19, 2004

(Under 37 CFR 1.47)

(51) Int. Cl.
*G02F 1/1339* (2006.01)

(52) U.S. Cl. ...................................................... 349/156

(58) Field of Classification Search ............. 349/156, 349/153, 155, 84, 94, 10, 86
See application file for complete search history.

(56) References Cited

U.S. PATENT DOCUMENTS

| | | | |
|---|---|---|---|
| 4,492,432 A | 1/1985 | Kaufmann et al. ......... 350/338 |
| 4,688,900 A | 8/1987 | Doane et al. ............ 350/347 V |
| 5,305,126 A | 4/1994 | Kobayashi et al. ............ 349/94 |
| 5,321,533 A | 6/1994 | Kumar ......................... 359/51 |
| 5,327,271 A | 7/1994 | Takeuchi et al. ............... 359/75 |
| 5,333,074 A | 7/1994 | Hikmet ......................... 359/51 |
| 5,399,390 A | * 3/1995 | Akins ......................... 428/1.2 |
| 5,434,685 A | 7/1995 | Pirs et al. ..................... 359/51 |
| 5,473,350 A | 12/1995 | Mader et al. .................. 347/7 |
| 5,473,450 A | 12/1995 | Yamada et al. ............... 359/51 |
| 5,477,358 A | 12/1995 | Rosenblatt et al. ............ 359/77 |
| 5,503,932 A | 4/1996 | Sakai et al. .................. 428/404 |
| 5,504,600 A | 4/1996 | Pirs et al. ...................... 359/51 |
| 5,530,566 A | 6/1996 | Kumar ......................... 359/51 |
| 5,539,545 A | * 7/1996 | Shimizu et al. ............... 349/86 |
| 5,583,672 A | 12/1996 | Kim ............................. 349/92 |
| 5,602,662 A | 2/1997 | Rosenblatt et al. ......... 349/130 |
| 5,621,553 A | 4/1997 | Nishiguchi et al. ......... 349/153 |
| 5,680,189 A | * 10/1997 | Shimizu et al. ............. 349/123 |
| 5,701,168 A | 12/1997 | Patel ........................... 349/130 |
| 5,729,312 A | 3/1998 | Yamagishi et al. ............ 349/86 |
| 5,729,319 A | * 3/1998 | Inou et al. .................... 349/156 |
| 5,751,382 A | * 5/1998 | Yamada et al. ................. 349/12 |
| 5,757,454 A | 5/1998 | Ogishima et al. ........... 349/129 |
| 5,870,162 A | * 2/1999 | Fujimori et al. ............. 349/143 |

(Continued)

*Primary Examiner*—Karl D. Frech
*Assistant Examiner*—Edwyn Labaze
(74) *Attorney, Agent, or Firm*—Fay, Sharpe, Fagan, Minnich & McKee, LLP

(57) ABSTRACT

A liquid crystal display device comprises two substrates facing and spaced from each other, at least one of the substrates being transparent; an electro-optical material filling a first portion of the space between the substrates, the electro-optical material comprising molecules whose spatial orientation can be altered by application of an electric field across the two substrates; and a polymeric material filling a second portion of the space between the substrates, the polymeric material having been polymerized in situ between the plates, wherein the polymeric material forms a multiplicity of microscopic polymer columns extending between the two substrates, and the columns provide both a structural bond between the two substrates for maintaining the spacing between the substrates and alignment of the molecules of the electro-optical material, with the alignment resulting from the close spacing of the microscopic columns. A method to fabricate electro-optical displays having two facing substrates, electro-optical material in the space between the substrates, and in-situ polymerized microscopic columns extending between the substrates is also disclosed.

45 Claims, 6 Drawing Sheets

U.S. PATENT DOCUMENTS

| | | | |
|---|---|---|---|
| 5,949,508 A | 9/1999 | Kumar et al. | 349/122 |
| 5,978,064 A * | 11/1999 | Nishiguchi | 349/156 |
| 5,986,734 A | 11/1999 | Winker et al. | 349/123 |
| 6,019,284 A | 2/2000 | Freeman et al. | 235/380 |
| 6,049,366 A | 4/2000 | Hakemi et al. | 349/86 |
| 6,067,142 A | 5/2000 | Anderson et al. | 349/130 |
| 6,078,378 A * | 6/2000 | Lu et al. | 349/155 |
| 6,266,121 B1 * | 7/2001 | Shigeta et al. | 349/156 |
| 6,320,634 B1 | 11/2001 | Winker et al. | 349/117 |
| 6,339,462 B1 * | 1/2002 | Kishimoto et al. | 349/156 |
| 6,417,908 B1 | 7/2002 | Nishiguchi et al. | 349/155 |
| 6,424,402 B1 * | 7/2002 | Kishimoto | 349/156 |
| 6,437,848 B1 | 8/2002 | Okada et al. | 349/156 |
| 6,621,548 B1 | 9/2003 | Freeman | 349/155 |
| 6,650,393 B1 | 11/2003 | Nishiguchi | 349/156 |
| 6,721,024 B1 * | 4/2004 | Kishimoto et al. | 349/123 |

* cited by examiner

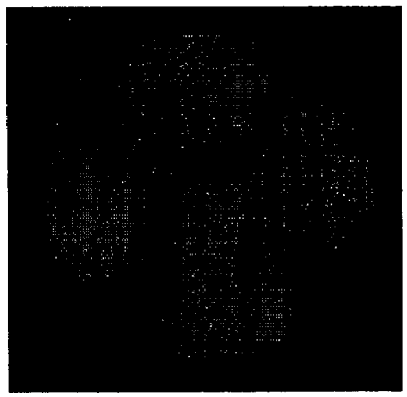
Fig. 3A
Fig. 3B
Fig. 3D
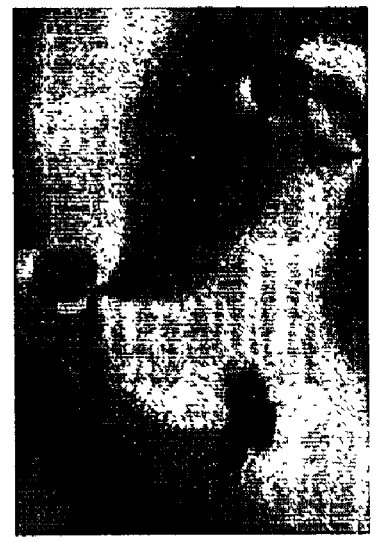
Fig. 3C

ELECTRO-OPTICAL DISPLAY WITH IN-SITU POLYMERIZED COLUMNS PROVIDING ALIGNMENT AND STRUCTURAL BOND BETWEEN SUBSTRATE

TECHNICAL FIELD

This invention relates to liquid crystal and other electro-optical displays.

BACKGROUND

Commercially, it is highly desirable for an electronic display (e.g., a liquid crystal display) to be as thin and light as possible while still maintaining a high degree of ruggedness to withstand forces resulting from pressure, decompression, shear, and shock. In the area of mobile electronics, such as cell phones and personal digital assistants (PDAs), size and weight are critical factors to the commercial success of a product, but currently breakage of the displays within these devices remains the primary cause of repairs and product returns.

In addition, the need for electronic displays that can actually be bent has been acknowledged in several areas. So-called 'electronic paper' in which fiber paper is replaced with a display would be much more compelling as a product if the electronic display could be rolled up or folded like traditional paper. Wearable electronics, such as computers or multifunction watches, would be much more comfortable to the wearer if the display were conformable. Chip cards, which have strict flexure life-test performance standards, would be able to incorporate flexible displays and still conform to those standards.

One approach to achieving the desired rugged and flexible display is to substitute polymer (or other flexible) substrates for the glass substrates conventionally used. Achieving such a substitution of polymer for glass has been an area of active research within the display community for a number of years.

Polymer substrates have the property of not springing back into their original shape, as do glass substrates, following flexure of the display. This can result in a change in the separation between the two substrates, with resulting degradation of display quality. A solution to this problem is providing a structural bond between the polymer substrates. A structural bond is able to maintain the spacing by keeping the polymer substrates engaged against intervening spacing elements (e.g., tiny glass spheres or fibers) even during flexure of the display.

Display contrast is another area in which rugged and flexible displays have had difficulty matching the performance of conventional displays. One technique for increasing display contrast is to give the liquid crystal molecules a homeotropic alignment (i.e., the optical axis, or long dimension, of the molecules is generally perpendicular to the faces of the substrates) in the absence of an electric field. This gives the display the highest possible contrast because in the off state a homeotropic cell placed between crossed polarizers has extremely low transmission. In other words, the dark state is as dark as it can be (and depends on the extinction ratio of the polarizers used). When an electric field is applied to the liquid crystal in a selected area of the cell, the molecules in that area deviate from the homeotropic alignment towards an oblique or planar alignment, in which the molecules assume an orientation generally oblique and even parallel to the substrate (perpendicular to the substrate normal).

There are various known ways of achieving homeotropic alignment. The most common technique is to provide an alignment layer of, e.g., lecithin, on one or both of the substrates. Other alignment techniques have been attempted. E.g., a pre-manufactured layer of filter material with tiny pores (in which the molecules are received) can be inserted between the substrate faces. An electric field can be applied during manufacturing to position the molecules in homeotropic orientation, while slender tendrils of polymer are polymerized between the molecules to hold them in the desired alignment (sometimes referred to as a "polymer stabilized" display). But none of these approaches provided a structural bond between the substrates, and thus are ineffective for achieving a rugged or flexible display.

An early effort at providing a structural bond between substrates was the polymer dispersed liquid crystal (PDLC) display, in which the liquid crystal molecules were dispersed within a polymer matrix. After assembling the display, the polymer was cured, typically by ultraviolet light. During the polymerization the liquid crystal separated out from the polymer into microscopic droplets. The polymer provided a structural bond between the substrates. As the droplets of liquid crystal were not in contact with either substrate face, an alignment layer could not be used to orient the molecules, and the displays were operated in a different and less desirable "scattering mode". Examples of PDLC displays and related technology are U.S. Pat. Nos. 4,688,900, 5,321,533, 5,327,271, 5,434,685, 5,504,600, 5,530,566, 5,583,672, 5,949,508, 5,333,074, and 5,473,450.

An improvement on the PDLC display was the Phase Separated Composite Organic Film (PSCOF) display (described in U.S. Pat. No. 5,949,508) in which the liquid crystal and polymer were disposed near opposite substrates, with widely separated support polymer dots extending fully across the gap between the faces. The dots provided an effective structural bond between the substrates and because in most locations one substrate face was exposed to the liquid crystal molecules, an alignment layer could be provided on one of the substrates. Typically, the alignment layer in PSCOF display positions the liquid crystal molecules in a homogeneous alignment (optical axis generally parallel with substrates), and the molecules are rotated to a homeotropic alignment by the presence of an electric field.

In both PDLC and PSCOF displays, the concentration of polymer was from 20 to 80 percent of the weight of the mixture of polymer and liquid crystal. In the polymer tendril (polymer stabilized) display, in which slender tendrils were formed while the molecules were held in homeotropic alignment by an applied electric field, the concentration of polymer was much less, e.g., about 3–5 percent by weight of the mixture of polymer and liquid crystal.

Other patents with potentially relevant background are: Rosenblatt et al., "Chiral Nematic Liquid Crystal with Homeotropic Alignment and Negative Dielectric Anistropy" (U.S. Pat. No. 5,477,358); Anderson et al., "Vertically Aligned Pi-Cell LCD having On-State with Mid-Plane Molecules Perpendicular to the Substrate" (U.S. Pat. No. 6,067,142); Patel, "Inverse Twisted and Super-twisted Nematic Liquid Crystal Device" (U.S. Pat. No. 5,701,168); Ogishima et al., "Liquid Crystal Display Device with Homeotropic Alignment in which Two Liquid Crystal Regions on the Same Substrate Have Different Pretilt Directions Because of Rubbing" (U.S. Pat. No. 5,757,454); Rosenblatt et al., "Cholesteric Liquid Crystal Devices" (U.S. Pat. No. 5,602,662); Kaufmann et al., "Homeotropic Nematic Display with Internal Reflector" (U.S. Pat. No. 4,492,432).

SUMMARY

We have discovered a form of in-situ polymerization that can achieve both a structural bond between the substrates and a homeotropic or other predetermined alignment.

In general the present invention provides a liquid crystal display device, containing two substrates facing and spaced from each other, at least one of the substrates being transparent, an electro-optical material filling a first portion of the space between the substrates, the electro-optical material comprising molecules whose spatial orientation can be altered by application of an electric field across the two substrates, and a polymeric material filling a second portion of the space between the substrates, the polymeric material having been polymerized in situ between the plates. The polymeric material forms a multiplicity of microscopic polymer columns extending between the two substrates. The columns provide both a structural bond between the two substrates for maintaining the spacing between the substrates and alignment of the molecules of the electro-optical material, with the alignment resulting from the close spacing of the microscopic columns.

The present invention also provides a method of manufacturing a liquid crystal display device. The method includes positioning two substrates that face each other, at least one of the substrates being transparent, and filling at least a portion of the space between the two substrates with a mixture of an electro-optical material and a polymeric material. The electro-optical material comprises molecules whose spatial orientation can be altered by application of an electric field across the two substrates. The polymeric material is then polymerized to form a multiplicity of microscopic polymer columns extending between the two substrates. The columns provide both a structural bond between the two substrates for maintaining the spacing between the substrates and alignment of the molecules of the electro-optical material, with the alignment resulting from the close spacing of the microscopic columns.

In some implementations of the invention, the invention may provide the following advantages (none of the following advantages will necessarily be achieved when practicing the invention, but the invention makes it possible to achieve some or all of these advantages in some implementations).

The structural bond between the substrates provided by the microscopic polymer columns can make the display insensitive to mechanical deformations and pressure, thus well suited for implementations requiring a rugged or flexible display.

Displays may be fabricated with high contrast. As homeotropic (perpendicular) alignment of the liquid crystal molecules may be achieved in the absence of an electric field, the OFF state of the display may be very dark, limited only by the quality of the polarizers used. The brightness of the ON state may be controlled by selecting liquid crystal material with suitable optical anisotropy or birefringence.

The displays may have fast response times, and require low operating voltages.

The details of one or more implementations or embodiments of the invention are set forth in the accompanying drawings and the description below. Other features, objects, and advantages of the invention will be apparent from the description and drawings, and from the claims.

DESCRIPTION OF DRAWINGS

FIGS. 3A, 3B, 3C, and 3D are images of one implementation of the invention.

DETAILED DESCRIPTION

Figure 1A:
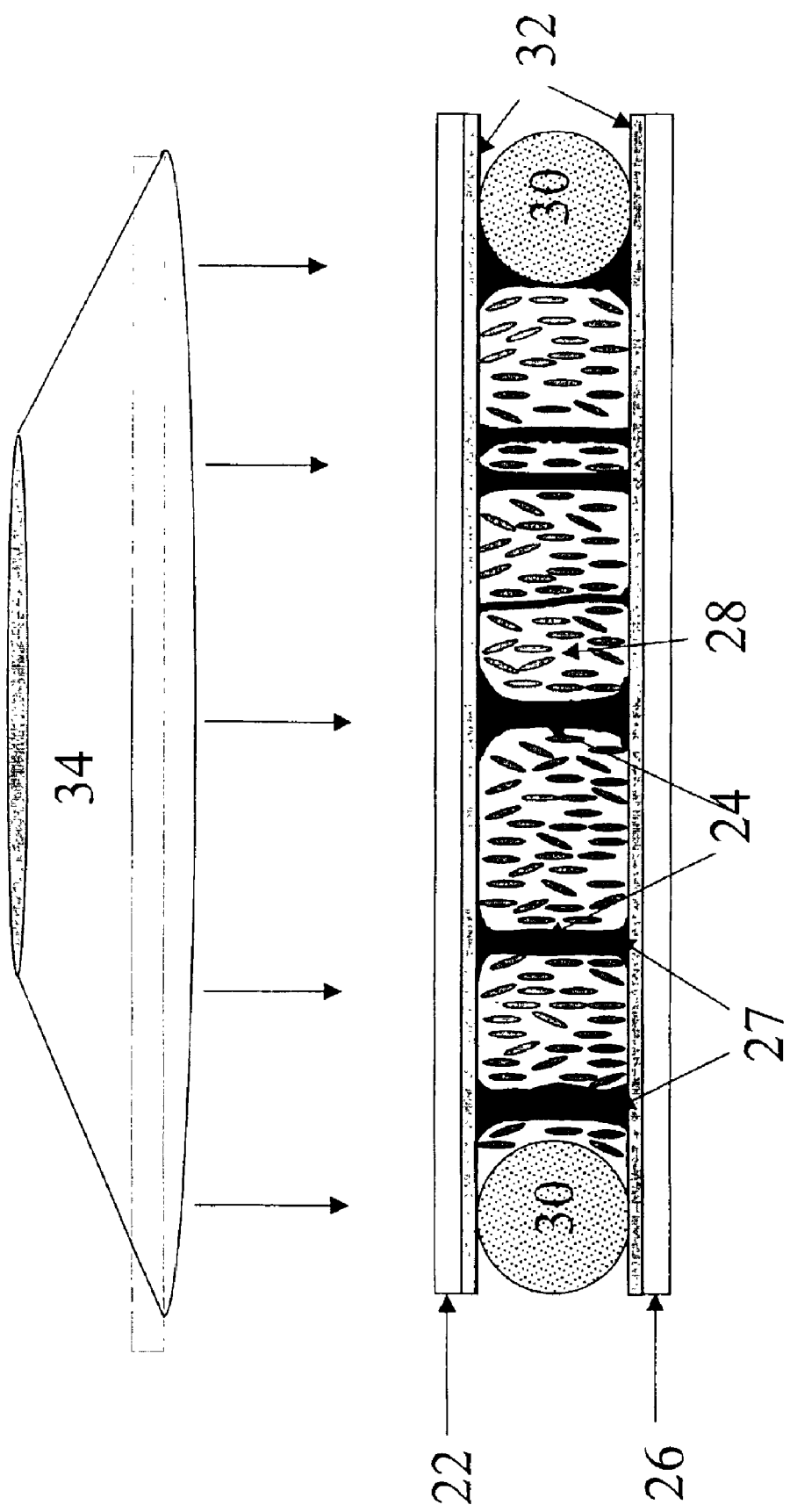
FIGS. 1A and 1B are diagrammatic cross sectional views of two possible implementations of the invention.

In preferred implementations of the invention, one or more of the following may be incorporated (none of the following features is necessary to implementing the invention in its most general forms):

The alignment of the electro-optical material provided by the columns may be either a homeotropic alignment or an oblique alignment. As described in more detail below, a homeotropic alignment is provided when the polymeric material is polymerized in such a manner as to form columns that are perpendicular to the substrate surface. For example, when the polymeric material is a photocurable polymeric material, the cell may be illuminated in such a way that causes UV or other radiation to fall on the substrate, and consequently the mixture of electro-optical material and polymeric material, coincident with the normal. The photocurable prepolymer polymerizes in columns that are perpendicular to the substrate, providing a homeotropic alignment of the electro-optical material. An oblique alignment can be achieved by forming columns at an angle that varies from the normal, for example, by illuminating the cell with light at an angle that deviates from the normal of the substrate. The photocurable prepolymer polymerizes in columns that are oblique relative to the normal. The orientation of the columns provides an oblique alignment of the electro-optical material.

The polymerization of the polymeric material may be achieved by any means known in the art for polymerizing a polymeric material for use in an electro-optical display device. For example, when a photocurable polymeric material is used, polymerization may be induced by irradiating the cell with ultraviolet light. The ultraviolet radiation may be applied to one of the substrates from the side opposite the side facing the mixture of polymeric material and electro-optical material. In one implementation, the in-situ polymerization may occur in the absence of an electric field capable of aligning the molecules in a homeotropic alignment.

It has been observed that when the polymeric material polymerizes, caps of polymerized material may form on one or both ends of the polymer column. These caps comprise a thin layer of polymer that has a substantially greater lateral extent than the diameter of the column. It is preferred that when these caps are present, a majority of the caps are separated from adjoining caps, such that a substantially continuous layer of polymer is not formed on the face of the first or second substrates adjoining the caps. The caps may differ in size on each end of the polymer column. In other words, the average lateral extent of the caps on the first end of a polymer column may be greater than the average lateral extent of the caps on the second end of a polymer column.

In one implementation, the polymeric material is greater than about 10 percent by weight of the mixture of polymeric material and electro-optical material. In another implementation, the polymeric material is greater than about 20 percent by weight of the mixture of polymeric material and electro-optical material. The average spacing between polymer columns may also vary. In one implementation, the average spacing between the microscopic columns is greater than about 3 microns (3 micrometers) and less than about 30 microns (30 micrometers). In another implementation, the average spacing between the microscopic columns is greater than about 5 microns (5 micrometers) and less than about 15 microns (15 micrometers).

Additional elements may be added to the liquid crystal display of the present invention. For example, spacer elements may be positioned between the two substrates. An alignment layer for aligning the molecules of the electro-optical material in the presence of an electric field may optionally be present. The alignment layer may provide a homeotropic, planar or oblique orientation to the electro-optical material which may be a liquid crystal material. It is also envisioned that in some applications it may be desirable that no alignment layer is provided for aligning the molecules of the electro-optical material in the absence of an electric field.

When an oblique alignment is provided in the cell, a liquid crystal having positive or negative dielectric anisotropy may be used. When a homeotropic alignment is provided, a liquid crystal having positive dielectric anisotropy may be used.

The substrates may be of any material known in the art as being suitable for electro-optical displays. In one example, the substrates are polymeric.

In one particular implementation of the present invention, the polymeric material is a photocurable polymeric material, polymerization of the polymeric material is initiated by ultraviolet radiation, an alignment layer for aligning the molecules of the electro-optical material in a homeotropic alignment is not provided, the polymeric material is greater than about 20 percent by weight of the mixture of polymeric material and the electro-optical material, there are spacer elements positioned between the two substrates, and the electro-optical material is a liquid crystal material.

In another implementation of the present invention, the polymeric material is a photocurable polymeric material, polymerization of the polymeric material is initiated by ultraviolet radiation an alignment layer for aligning the molecules of the electro-optical material in a homeotropic alignment is not provided, the alignment provided by the columns is homeotropic, the polymeric material is greater than about 20 percent by weight of the mixture of polymeric material and the electro-optical material, there are spacer elements positioned between the two substrates, the electro-optical material is a liquid crystal material, and most of the polymer columns comprise a first cap on a first end of the column, the first cap being a thin layer of polymer of substantially greater lateral extent than the diameter of the column.

Described below in greater detail are some of the many possible implementations of the invention. As this is a discussion of implementations of the invention, many of the features and elements described in this section are not essential to practicing the invention.

One preferred implementation of the invention may be prepared as follows: Two glass substrates 22, 26 (FIG. 1A) are coated with transparent indium tin oxide (ITO) electrodes 32. These substrates are separated by glass fibers 30 of 3–5 micrometer diameter. A mixture of photocurable prepolymer (e.g., NOA65, NOA68, or NOA77 from Norland Products Inc.) and liquid crystal (MJ 991213 (MJ) with negative dielectric anisotropy from Merck Korea Ltd.) are mixed in the ratio 1:1, and then injected into the cell by capillary action at 95 degrees Celsius. The cell is then exposed (through one substrate) to collimated ultraviolet (UV) light 34 at the same temperature. The intensity of UV light (including 360 nm wavelength) at the glass surface is approximately 1.3 mW/cm$^2$. Illumination by UV light initiates polymerization of pre-polymer molecules and, consequently, the phenomenon of phase separation, which, among other parameters, depends upon the interplay between the surface interactions and the inter-diffusion of liquid crystal and prepolymer at the molecular level. P. S. Drazaic, ed., *Liquid Crystal Dispersions* (World Scientific, Singapore, 1995). The prepolymer wets the indium tin oxide surface relatively faster than the liquid crystal molecules, and the microdroplets formed at the surface during photopolymerization act as nucleation sites for the development of polymer columns. During polymerization, more prepolymer molecules diffuse to these nucleation sites and undergo polymerization, thus forming columns. These polymer columns provide the necessary boundary condition for the homeotropic alignment of the liquid crystal molecules. The number, density, and size of the polymer columns are affected by the physiochemical nature of the liquid crystal material, prepolymer, polymer, cell thickness, and the rate of phase separation. By suitable adjustment of these physio-chemical parameters and other external parameters such as the exposure temperature and UV intensity, one can obtain polymer columns that provide a structural bond between the two substrates while also providing homeotropic alignment of the liquid crystal molecules.

FIG. 1A shows a diagrammatic cross sectional view of one possible implementation of the invention. Microscopic polymer columns 24 extend downwardly toward the bottom substrate 26. Most of the columns (i.e., more than 50%) have a cap 27 at one or both ends of the column. The caps are thin layers of polymer, with a lateral extent (i.e., parallel to the surfaces of the substrates) substantially greater than the diameter of the columns, themselves. Most of the caps do not contact adjacent caps, with the result that there is not the continuous layer of polymer adjacent a substrate (as was the case in PSCOF displays). The width of the columns may remain nearly uniform along the height of the columns (or the width of the columns may vary). There may be a range of column widths, with some columns being much narrower than others (or the columns may be nearly the same in width). Liquid crystal material 28 fills the spaces not occupied by the columns. Spacers 30 (e.g., glass fibers or spheres) space the two substrates 22, 26 apart by a predetermined distance. The polymer columns provide a structural bond between the two substrates, holding the substrates against the spacers.

Figure 1B:
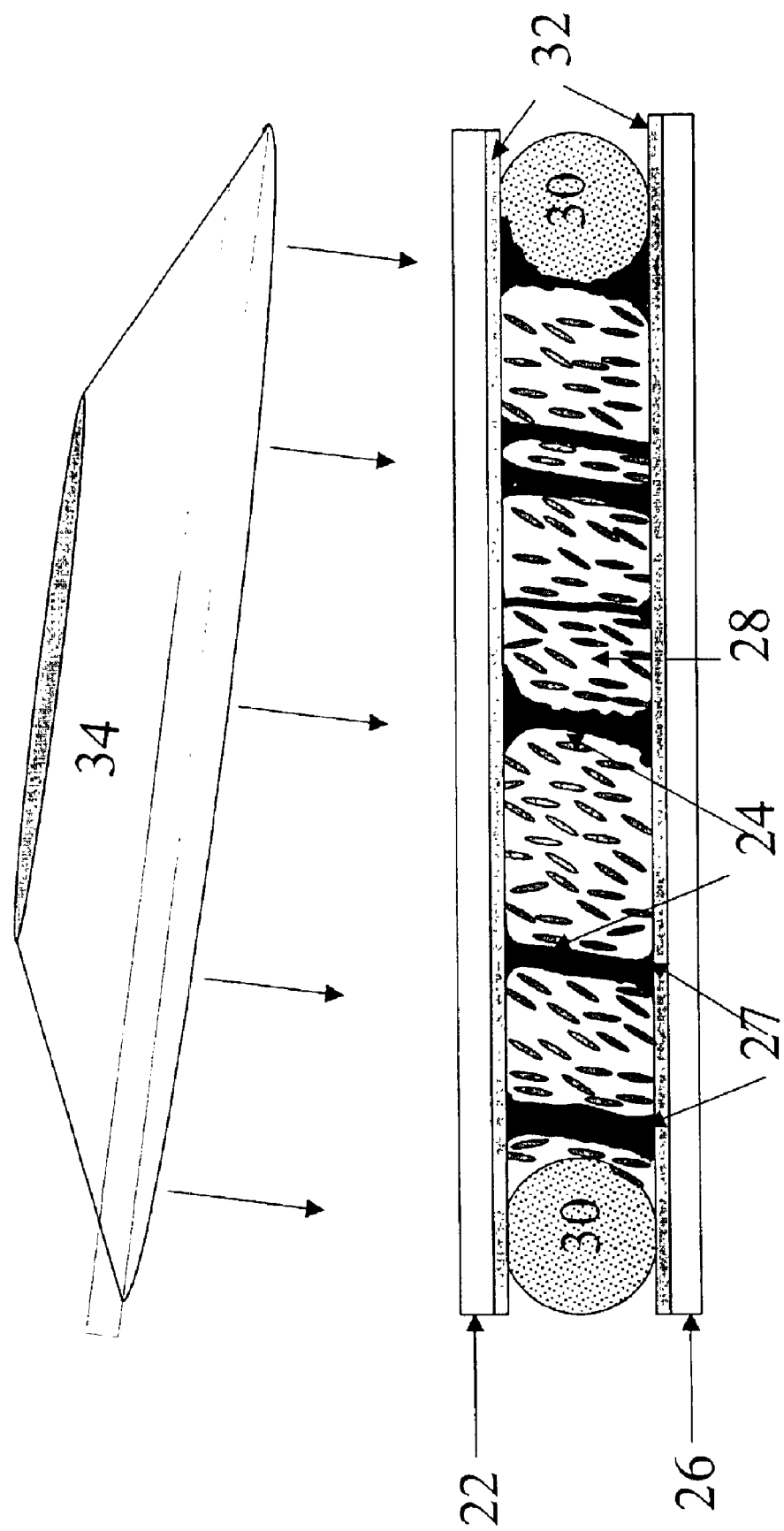

In another implementation, shown in FIG. 1B, one may use a collimated UV beam for oblique illumination of the cell during the polymerization-phase separation process. Then, the polymer columns 24 will be formed obliquely, which will, in turn, align the liquid crystal molecules in an oblique orientation. Application of an electric field will reorient the molecules to a planar or homeotropic orientation depending on whether the liquid crystal has negative or positive dielectric anisotropy.

Figure 2A:
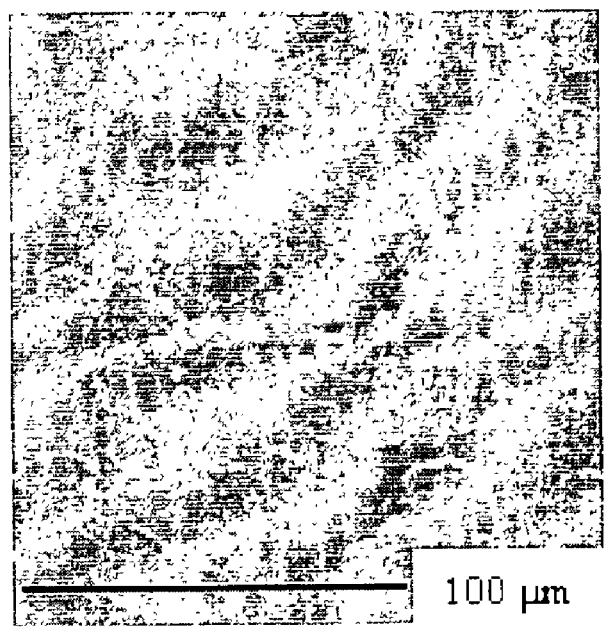
FIGS. 2A and 2B are scanning microscope photographs showing the microscopic columns of one implementation of the invention.
Figure 2B:
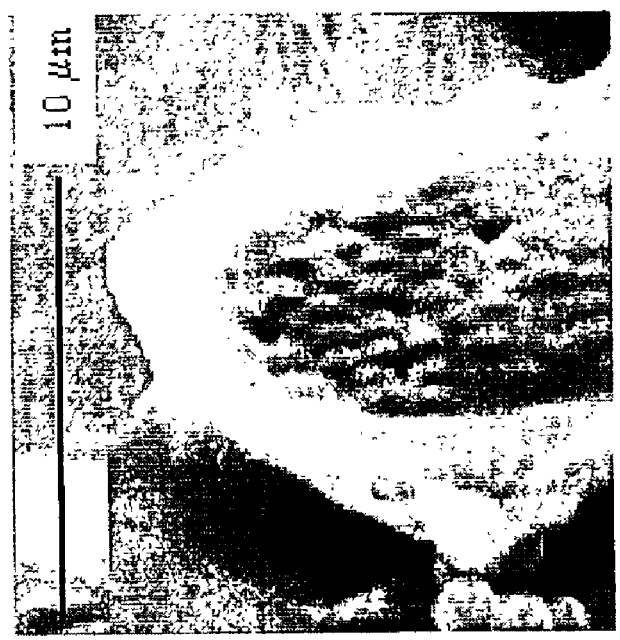

FIG. 2A shows a scanning electron microscope (SEM) image of the polymer columns (NOA65-MJ mixture) after the liquid crystal has been washed away with hexane. FIG. 2B shows a tilted and magnified view of one of caps and one of the columns (partially visible below the cap).

FIG. 3A shows the microscopic texture of a 3-micron thick glass cell using a 1:1 NOA68-MJ mixture (50% by weight of each material) under crossed polarizers. The polymer columns appear dark under crossed polarizers, and liquid crystal defect lines interconnect them.

FIG. 3B is the conoscopic image of the same cell. A dark cross at the center of the field of view which is unaffected by rotation of the cell about its surface normal ensures the vertical alignment of the liquid crystal director.

FIG. 3C shows the microscopic texture of the same cell after a square wave electric field of amplitude 4 V at 1 kHz is applied across the cell. As the polymer columns extend vertically with no pretilt, the electric field reorients the liquid crystal director in the plane of the substrates with no preferential azimuthal orientation as indicated by the Schlieren.

FIG. 3D shows a prototype glass display fabricated using a 1:1 NOA68-MJ mixture. The indium-tin-oxide electrodes are etched away in the segmented area so that the application of the electric field across the cell switches the liquid crystals in the rest of the cell.

Figure 4:
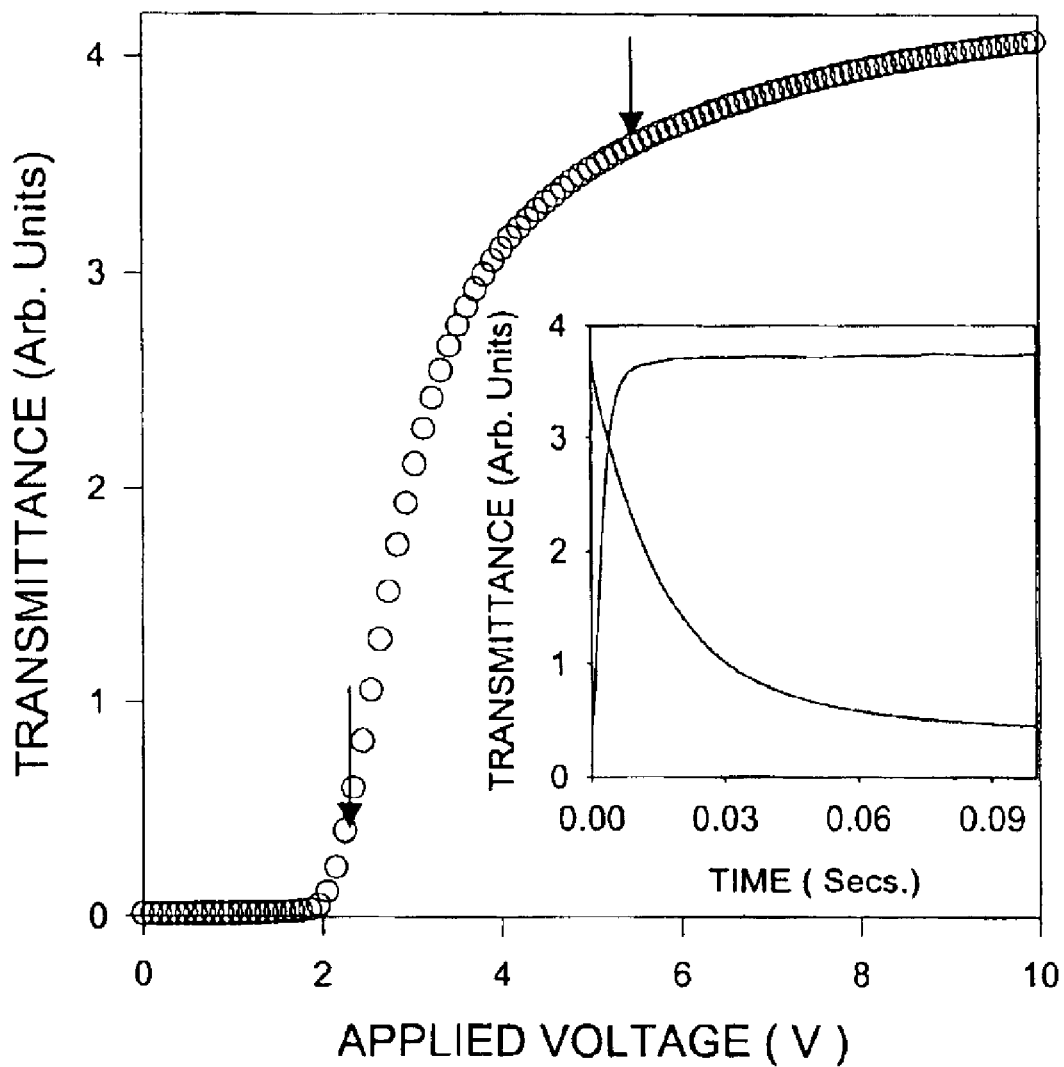
FIG. 4 is a plot of transmittance versus applied voltage for one implementation of the invention.

The performance of a liquid crystal display depends heavily upon its electrooptical properties. B.Bahadur, ed., *Liquid Crystals: Application and Uses, Vol.* 1 (World Scientific, Singapore, 1995). FIG. 4 shows the transmittance versus voltage (T-V) characteristics of a glass liquid crystal cell made by using a 1:1 NOA68-MJ mixture. The T-V characteristic of the cell is almost identical to a liquid crystal cell with a conventional homeotropic alignment layer. The gradual increase in the transmittance above approximately 5 V is due to the strong anchoring of the liquid crystal molecules on the walls of the polymer columns and small liquid crystal molecules trapped inside the polymer columns. The inset in FIG. 5 shows the switching time characteristic of the same cell under application of 2.25 V and 5.8 V corresponding to 10 and 90 percentage of the maximum transmittance. The response times of the cell, turn-on and turn-off times are 10 and 50 milliseconds, respectively, which are typical values for nematic liquid crystal displays.

Figure 5A:
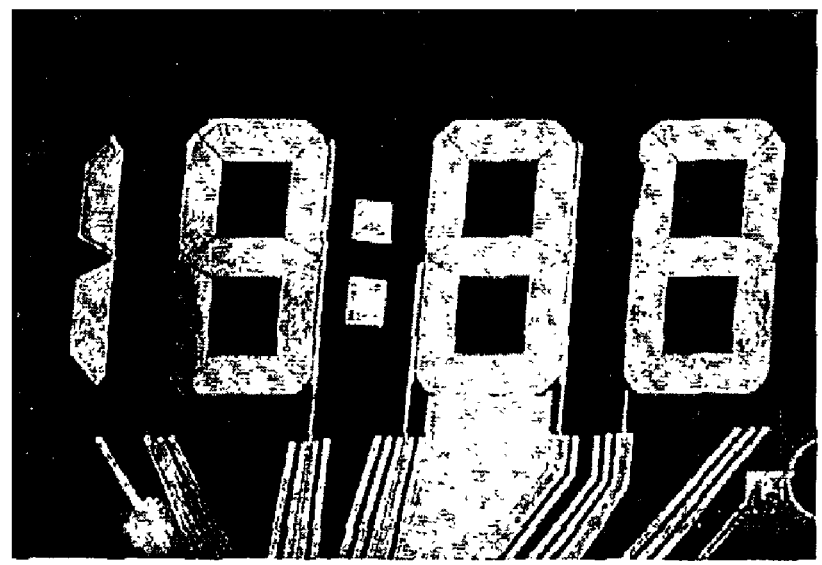
FIGS. 5A and 5B are photographs of a prototype display constructed according to one implementation of the invention.
Figure 5B:
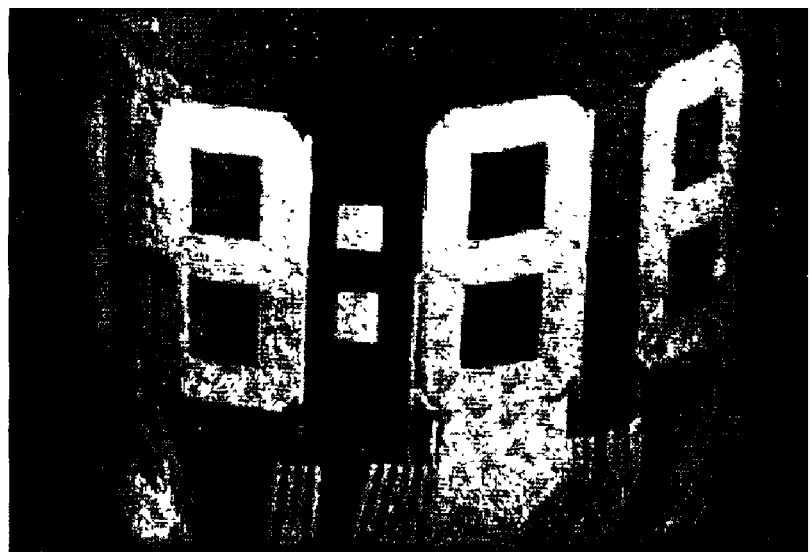

Using a 1:1 NOA77-MJ mixture and 100 micron thick polymer (polyethersulphone) substrates separated by 5 micron thick spacers, a prototype display 2 in. by 3 in. was fabricated. FIG. 5A shows the display in the ON state. For this display, the active regions are the segments across which a square wave electric field with amplitude 6 V at 1 kHz has been applied. FIG. 5B shows the same display in the ON state flexed at the center with a radius of curvature of 1.25 inches. When flexed, the non-active area of the display appears gray at the edges due to the optical birefringence rendered by the inclined liquid crystal director (i.e., large viewing angle). However, at the normal view, the contrast ratio does not change by flexing the display. Because the plastic substrates are bonded together by polymer columns, application of an external pressure has minimal effect on the display and it returns to its normal performance almost immediately after the pressure is released.

A variety of factors may influence whether the in-situ polymerized columns of the invention are achieved. The relative viscosity and wetting capabilities of both the liquid crystal and the pre-polymer appear to be important factors. These factors affect the ability of the pre-polymer to separate from the mixture and wet the surface of a substrate to form nucleation sites, where the caps and columns begin to grow. As polymerization proceeds, with the polymer caps and columns growing in size, it appears to be important that the liquid crystal be capable of separating rapidly from the mixture, so as not to become trapped in pockets within the polymer (e.g., as occurs in PDLC displays). The amount of functionality of the oligomers (e.g., the number of locations at which polymer strands can attach) may also have an important effect on the manner and speed with which the polymer separates from the mixture.

A number of implementations of the invention have been described. Nevertheless, it will be understood that many and various modifications may be made without departing from the invention. For example: It may be possible to substitute a electro-optical polymer for the liquid crystal material. Alignment layers of appropriate but low anchoring energy may be used on one or both substrates to define the azimuthal direction for the molecular reorientation in the ON state (when the applied electric field causes planar orientation during operation of the display); such alignment layers are not relied on for achieving homeotropic alignment of the molecules in the OFF state, as the microscopic polymer columns provide that alignment. It may be desirable in some circumstances to use a homeotropic alignment layer in conjunction with the polymer columns, so that both the alignment layer and the polymer columns reinforce homeotropic alignment. More than one column may extend from a single cap (e.g., during polymerization a plurality of caps could merge together to form a single cap with multiple columns, or smaller-diameter columns could form along with a wider column). Not all of the columns need to provide a structural bond between the substrates, as the structural bond can be provided by the columns in the aggregate. A great many other examples exist, and thus many other implementations are within the scope of the following claims.

Some of the claims refer to "polymeric material," which, depending on context, may be either a polymer or a pre-polymeric material that exists prior to polymerization.

What is claimed is:

1. A liquid crystal display device, comprising:

two substrates facing and spaced from each other, at least one of the substrates being transparent;

an electro-optical material filling a first portion of the space between the substrates, the electro-optical material comprising molecules whose spatial orientation can be altered by application of an electric field across the two substrates; and a polymeric material filling a second portion of the space between the substrates, the polymeric material having been polymerized in-situ between the substrates, wherein the polymeric material forms a multiplicity of microscopic polymer columns extending between the two substrates, and the columns provide both a structural bond between the two substrates for maintaining the spacing between the substrates and alignment of the molecules of the electro-optical material, with the alignment resulting from the close spacing of the microscopic columns.

2. A method of manufacturing a liquid crystal display device, comprising:

positioning two substrates that face each other, at least one of the substrates being transparent;

filling at least a portion of the space between the two substrates with a mixture of an electro-optical material and a polymeric material, the electro-optical material comprising molecules whose spatial orientation can be altered by application of an electric field across the two substrates;

polymerizing the polymeric material in-situ to form a multiplicity of microscopic polymer columns extending between the two substrates, wherein the columns are generally isolated from one another and provide both a structural bond between the two substrates for maintaining the spacing between the substrates and alignment of the molecules of the electro-optical material, with the alignment resulting from the close spacing of the microscopic columns.

3. The subject matter of claim 1 or 2 wherein the alignment provided by the columns is homeotropic.

4. The subject matter of claim 3 wherein most of the polymer columns comprise a first cap on a first end of the column, the first cap being a thin layer of polymer of substantially greater lateral extent than the diameter of the column.

5. The subject matter of claim 4 wherein most of the first caps are separated from adjoining first caps, so that there is not a substantially continuous layer of polymer on the face of the substrate adjoining the first caps.

6. The subject matter of claim 4 wherein most of the polymer columns comprise the first cap on the first end of the column and a second cap on the second end of the column, the second cap being a thin layer of polymer of substantially greater lateral extent than the diameter of the column.

7. The subject matter of claim 6 wherein the average lateral extent of the second caps is less than the average lateral extent of the first caps.

8. The subject matter of claim 4 wherein the electro-optical material is a liquid crystal material.

9. The subject matter of claim 8 wherein the liquid crystal material has negative dielectric anisotropy.

10. The subject matter of claim 8 wherein the polymeric material is a photocurable polymeric material.

11. The subject matter of claim 10 wherein polymerization of the polymeric material is initiated by ultraviolet radiation.

12. The subject matter of claim 11 wherein the ultraviolet radiation is applied to only one of the two substrates from the side of the substrate opposite the side facing the mixture of polymeric material and electro-optical material.

13. The subject matter of claim 8 wherein the polymeric material is greater than about 10 percent by weight of the mixture of polymeric material and liquid crystal material.

14. The subject matter of claim 8 wherein the polymeric material is greater than about 20 percent by weight of the mixture of polymeric material and liquid crystal material.

15. The subject matter of claim 8 further comprising spacer elements positioned between the two substrates.

16. The subject matter of claim 8 wherein the substrates are polymeric.

17. The subject matter of claim 8 wherein the average spacing between the microscopic columns is greater than about 3 microns and less than about 30 microns.

18. The subject matter of claim 8 wherein the average spacing between the microscopic columns is greater than about 5 microns and less than about 15 microns.

19. The subject matter of claim 8 wherein no alignment layer is provided for aligning the molecules of the electro-optical material in the absence of an electric field.

20. The subject matter of claim 8 further comprising an alignment layer for aligning the molecules of the electro-optical material in the presence of an electric field, the microscopic polymer columns providing a different alignment in the absence of the electric field.

21. The subject matter of claim 8 wherein the in-situ polymerization occurs in the absence of an electric field capable of aligning the molecules in a homeotropic alignment.

22. The subject matter of claim 8 wherein:
    the polymeric material is a photocurable polymeric material;
    polymerization of the polymeric material is initiated by ultraviolet radiation;
    an alignment layer for aligning the molecules of the electro-optical material in a homeotropic alignment is not provided;
    the polymeric material is greater than about 20 percent by weight of the mixture of polymeric material and the electro-optical material, and
    there are spacer elements positioned between the two substrates.

23. The subject matter of claim 3 wherein the electro-optical material is a liquid crystal material.

24. The subject matter of claim 23 wherein the polymeric material is a photocurable polymeric material.

25. The subject matter of claim 24 wherein polymerization of the polymeric material is initiated by ultraviolet radiation.

26. The subject matter of claim 25 wherein the ultraviolet radiation is applied to only one of the two substrates, from the side of the substrate opposite the side facing the mixture of polymeric material and electro-optical material.

27. The subject matter of claim 23 wherein the polymeric material is greater than about 10 percent by weight of the mixture of polymeric material and electro-optical material.

28. The subject matter of claim 23 wherein the polymeric material is greater than about 20 percent by weight of the mixture of polymeric material and liquid crystal material.

29. The subject matter of claim 23 further comprising spacer elements positioned between the two substrates.

30. The subject matter of claim 23 wherein the substrates are polymeric.

31. The subject matter of claim 23 wherein the average spacing between the microscopic columns is greater than about 3 microns and less than about 30 microns.

32. The subject matter of claim 23 wherein the average spacing between the microscopic columns is greater than about 5 microns and less than about 15 microns.

33. The subject matter of claim 23 wherein no alignment layer is provided for aligning the molecules of the electro-optical material in the absence of an electric field.

34. The subject matter of claim 23 further comprising an alignment layer for aligning the molecules of the electro-optical material in the presence of an electric field, the microscopic polymer columns providing a different alignment in the absence of the electric field.

35. The subject matter of claim 23 wherein the in-situ polymerization occurs in the absence of an electric field capable of aligning the molecules in a homeotropic alignment.

36. The subject matter of claim 23 wherein:
    the polymeric material is a photocurable polymeric material;
    polymerization of the polymeric material is initiated by ultraviolet radiation;
    an alignment layer for aligning the molecules of the electro-optical material in a homeotropic alignment is not provided;
    the polymeric material is greater than about 20 percent by weight of the mixture of polymeric material and the electro-optical material, and
    there are spacer elements positioned between the two substrates.

37. The subject matter of claim 3 wherein the in-situ polymerization occurs in the absence of an electric field capable of aligning the molecules in a homeotropic alignment.

38. The subject matter of claim 1 or 2 wherein the alignment provided by the columns is oblique.

39. The subject matter of claim 38 wherein most of the polymer columns comprise a first cap on a first end of the column, the first cap being a thin layer of polymer of substantially greater lateral extent than the diameter of the column.

40. The subject matter of claim 38 wherein the electro-optical material is a liquid crystal material.

41. The subject matter of claim 40 wherein the liquid crystal material has negative dielectric anisotropy.

42. The subject matter of claim 40 wherein liquid crystal material has positive dielectric anisotropy.

43. The subject matter of claim 1 or 2 further comprising an alignment layer for aligning the molecules of the electro-optical material in the presence of an electric field, the microscopic polymer columns providing a different alignment in the absence of the electric field.

44. The subject matter of claim 43 wherein the alignment layer for aligning the molecules in the presence of an electric field provides a planar or oblique orientation.

45. A liquid crystal display device comprising:

two substrates facing and spaced from each other, at least one of the substrates being transparent;

an electro-optical material filling a first portion of the space between the substrates, the electro-optical material comprising molecules whose spatial orientation can be altered by application of an electric field across the two substrates; and a polymeric material filling a second portion of the space between the substrates, the polymeric material having been polymerized in-situ between the substrates, wherein the polymeric material forms a multiplicity of microscopic polymer columns extending between the two substrates, and the columns provide both a structural bond between the two substrates for maintaining the spacing between the substrates and alignment of the molecules of the electro-optical material, with the alignment resulting from the close spacing of the microscopic columns, and wherein no alignment layer is provided for aligning the molecules of the electro-optical material in the absence of an electric field.

* * * * *